Feb. 18, 1969 D. F. GRAF 3,428,746

NOISE GATING CIRCUIT FOR SYNCHRONIZING SIGNAL SEPARATOR

Filed Jan. 10, 1966

INVENTOR

David F. Graf

BY Hofgren, Wegner, Allen, Stellman & McCord

ATTORNEYS

United States Patent Office 3,428,746
Patented Feb. 18, 1969

3,428,746
NOISE GATING CIRCUIT FOR SYNCHRONIZING SIGNAL SEPARATOR

David F. Graf, Morton Grove, Ill., assignor to Warwick Electronics Inc., a corporation of Delaware
Filed Jan. 10, 1966, Ser. No. 519,709
U.S. Cl. 178—7.3 5 Claims
Int. Cl. H04n 5/48

ABSTRACT OF THE DISCLOSURE

A noise gating circuit for a synchronizing signal separator in a television receiver has an electron device shunted across the signal path to the separator and normally held in a non-conductive condition. On the occurrence of a high amplitude noise pulse the electron device is rendered conductive, clamping the components video signal to prevent the noise from reaching the sync separator.

This invention relates to a noise gating circuit for a synchronizing signal separator in a television receiver, and more particularly to a clamping circuit for reducing the effect of noise impulses on a synchronizing signal separator.

In a television receiver, a detected composite television signal at the video amplifier may be accompanied by undesirable noise impulses of greater amplitude than the amplitude of snchronizing signal components of the composite signal. Typical synchronizing signal separators are capacity coupled to the video amplifier, to provide bias for a separator tube or transistor. As is well known, the large amplitude noise impulses will charge the capacitor and prevent subsequent synchronizing signal components from being detected.

In order to prevent this condition, various circuits have been employed to reduce the effect of noise impulses on the synchronizing signal separator. One typical circuit known in the art uses a multiple grid electron tube in which the composite video signal is DC coupled to a control grid and an inverted noise signal is coupled to another grid of the tube for canceling the noise impulses. Such a circuit requires a plurality of power supplies for its proper operation, due to the large DC component of the composite signal on the control grid. For example, the cathode of the tube may be coupled to B+, and the plate coupled to booster B+ from the horizontal deflection circuit of the television receiver. Unfortunately, the power available from the booster B+ supply is limited. If the plate is coupled to the low voltage B+ supply, a negative voltage must be provided to operate the tube properly.

Other typical circuits have AC coupled a noise gating apparatus to the video amplifier, allowing strong signals to block the gate in the same manner that strong signals block an AC coupled synchronizing separator.

A principal object of this invention is to provide an improved noise gating circuit for a synchronizing signal separator.

Another object of the invention is to provide a noise gating circuit incorporating a clamping means for reducing the effect of large amplitude impulses on a synchronizing signal separator.

One feature of this invention is the provision of a noise gating circuit utilizing a clamping device coupled across the source of composite signal, allowing the synchronizing signal separator to be of simple and economic design. Such a synchronizing separator may be operated from a single power supply readily available in a television reciever.

Another feature of this invention is the provision of a noise clamping circuit for a synchronizing signal separator which is DC coupled to the source of composite signal.

Yet another feature of this invention is the provision of a noise clamping circuit using an electron device having first and second terminals with conductive and nonconductive states therebetween under control of a signal at a third terminal. The first and second terminals are coupled across a video amplifier. An impedance dividing network DC couples the third terminal to the video amplifier, causing the electron device to conduct when noise signals of a predetermined amplitude greater than the amplitude of the synchronizing signal components are present. The conducting device clamps the level of the signal coupled to the grid leak capacitor of a synchronizing signal separator to a value equal to or less than the value of the synchronizing components.

Further features and advantages of the invention will become apparent from the following specification and from the drawings, in which.

Figure 1:
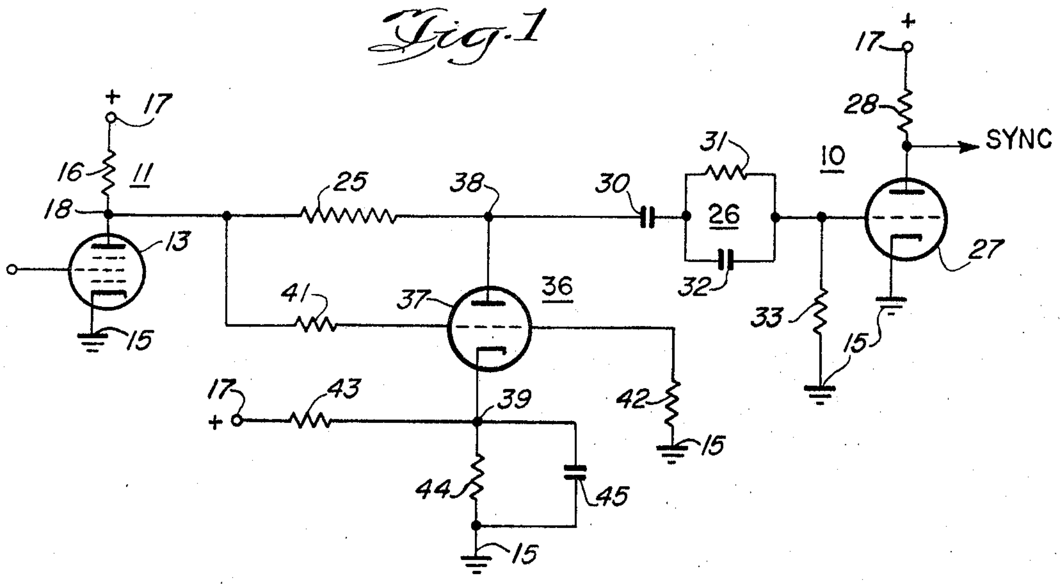
FIGURE 1 is a schematic diagram of a circuit embodying the invention.

While an illustrative embodiment of the invention is shown in the drawings and will be described in detail herein, the invention is susceptible of emobdiment in several different forms and it should be understood that the present disclosure is to be considered as an exemplification of the principles of the invention and is not intended to limit the invention to the embodiment illustrated. Throughout the specification, values and type designations will be given for the components in order to disclose a complete, operative embodiment of the invention. However, it should be understood that such values and types are merely representative and are not critical unless specifically so stated. The scope of the invention will be pointed out in the appended claims.

In FIGURE 1, a portion of a television receiver is illustrated including a synchronizing signal separator 10 coupled to a video amplifier 11. The remaining stages of the television receiver (not illustrated), for either black and white or color reception, may comprise any of a variety of circuits well known in the art.

Video amplifier 11 includes a pentode tube 13, the pentode section of an 8JV8, driven by a detected composite television signal coupled between a grid electrode of the tube and a cathode electrode connected to a source 15 of ground reference potential. The plate of pentode 13 is connected through a 4.7 kilohm resistor 16 to a terminal 17 connected with a low voltage DC power supply, as positive 145 volts.

Figure 2:
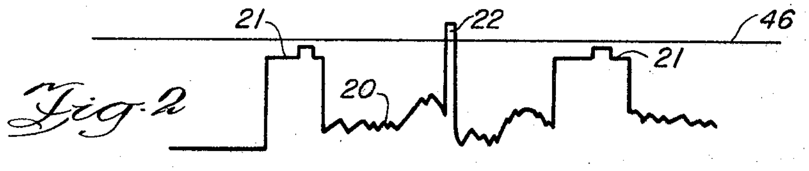
FIGURE 2 is a diagram illustrating a composite video signal accompanied by undesirable noise impulses, present at the plate of the video amplifier in FIGURE 1.

At a junction 18 between the plate of pentode 13 and resistor 16, a composite video signal, seen in FIGURE 2, is available. This composite signal includes a video portion 20 and a synchronizing signal component 21. In addition, noise impulses 22 having a greater amplitude than the amplitude of the synchronizing signal component 21 may accompany the composite video signal.

The video amplifier 11 of FIGURE 1 is only illustrative of known circuits, and the composite signal at junction 18 may be available, for example, at the cathode of the picture tube.

The composite television signal is coupled through a 22 kilohm resistor 25 to the grid leak circuit 26 of synchronizing signal separator 10. The separator is simply and economically constructed from a single triode tube 27, which may be one-half of a 12AT7. The cathode of triode 27 is connected directly to ground 15. The plate of the triode is coupled through a 56 kilohm resistor 28 to the low voltage power supply at terminal 17. The separated synchronizing signal component is available at the junction between the plate of triode 27 and resistor 28.

Grid leak circuit 26 includes a 0.0033 microfarad capacitor 30 in series with a paralleled 270 kilohm resistor 31 and a 470 micromicrofarad capacitor 32, which is connected to the grid of triode 27. A 3.3 megohm resistor 33 is connected from the grid to ground 15.

A noise gating circuit 36 is provided between video amplifier 11 and separator 10 to prevent the noise impulses 22 from adversely affecting separator 10. Circuit 36 clamps at a level equal to or less than the amplitude of the synchronizing signal components 21, thereby preventing heavy conduction in grid leak circuit 26 which would block separator 10.

Noise gating circuit 35 may be formed from an electron device, as a triode 37 which may be the other half of the 12AT7, having a pair of terminals with conducting and nonconducting states therebetween under control of a signal at a third terminal. The pair of terminals in triode 36 corresponds to the plate, which is coupled to a junction 38 between resistor 25 and capacitor 30, and the cathode, which is coupled to a junction 39 having a reference potential. The control terminal, or grid of triode 37, is coupled to a voltage divider network connected across viedo amplifier 11. The voltage divider consists of a 220 kilohm resistor 41 and a 100 kilohm resistor 42 connected in series between the plate of pentode 13 and ground 15. The grid of triode 37 is connected to the junction between resistors 41 and 42, thereby DC coupling the grid to the composite video signal.

The junction 39 is held at a positive potential, as 40 volts, by electrically connecting the junction to another voltage dividing network consisting of a 12 kilohm resistor 43 and a 56 kilohm resistor 44 connected in series between supply terminal 17 and ground 15. Resistor 44 is bypassed by a 0.1 microfarad capacitor 45.

Figure 3:
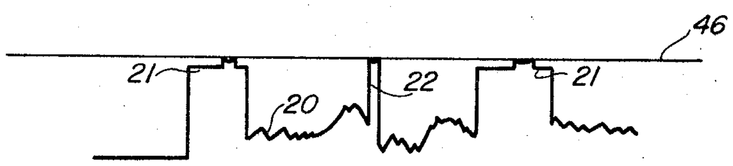
FIGURE 3 is a diagram illustrating the composite video signal coupled to the synchronizing signal separator of FIGURE 1.

The value of resistors 25, 41, 42, 43 and 44 are adjusted so that triode 37 does not conduct when a signal equal to or less than a signal clamping level 46, seen in FIGURE 2, is present at junction 18. Level 46 may be equal or greater in amplitude than the peak amplitude of the synchronizing signal componet 21. When a signal of greater amplitude than level 46 is present, triode 37 conducts, causing current to flow through resistor 25 and conducting triode 37 to ground 15. As a result, noise impulse 22 at junction 38 is clamped, as seen in FIGURE 3, to a level equal to the amplitude of the synchronizing signal component 21. If desired, triode 37 could clamp at a level below the amplitude of synchronizing component 21. With the addition of noise gating circuit 36, synchronizing signal separator 10, although of simple and economic design, is rendered very effective even in the presence of large amplitude noise impulses.

I claim:

1. In a television signal receiver including a synchronizing signal separator coupled to a source of composite video signals which may be accompanied by undesirable noise impulses, clamping means for reducing the amplitude of noise impulses exceeding a level at least equal to the amplitude of the synchronizing signal components, comprising:

an electron device with first, second, and third terminals, said device having conducting and nonconducting states between said first and second terminals under control of a signal at said third terminal;

means coupling the first and second terminals across said source;

a voltage divider network coupled across said source;

means coupling said third terminal to said network, signals of an amplitude less than the amplitude of said level biasing the electron device in the nonconducting state and signals of greater amplitude than the amplitude of said level biasing the electron device in the conducting state, thereby reducing the effect of said noise impulses on said synchronizing separator.

2. The clamping means of claim 1 wherein said electron device comprises an electron tube including plate, cathode, and grid electrodes corresponding to said first, second, and third terminals.

3. The clamping means of claim 1 for a synchronizing signal separator AC coupled to said source, wherein said voltage divider network includes first and second impedance means connected in series across the source and having a DC signal path therethrough, said coupling means DC connecting said third terminal to the DC signal path at the junction between said first and second impedance means.

4. The clamping means of claim 3 wherein said electron device comprises an electron tube including plate, cathode, and grid electrodes corresponding to said first, second, and third terminals, means connecting one side of said source to a reference potential, said means coupling the first and second terminals across said source including means coupling said cathode electrode to said reference potential and first resistive means connected between the other side of said source and the plate electrode, first capacitor means connected between said plate electrode and the separator for AC coupling the composite signal thereto, said grid being held at a DC potential sufficient to keep the tube nonconducting when an AC signal of amplitude equal to said level appears across the source, wherein the noise impulses drives the tube into conduction, causing current to flow through the first resistive means and the tube, thereby clamping the noise impulses coupled through the capacitor to an amplitude which does not exceed the amplitude of the synchronizing signal components.

5. The clamping means of claim 4 wherein the means coupling said cathode electrode to said reference potential comprises a paralleled second resistive means and second capacitor means, and third resistive means connected in series with the second resistive means and a source of D.C. potential, forming a second voltage divider network that maintains the cathode electrode at a fixed DC reference potential.

References Cited

UNITED STATES PATENTS 2,879,330 3/1959 Procter ............ 178—7.3

ROBERT L. GRIFFIN, *Primary Examiner.*

ROBERT L. RICHARDSON, *Assistant Examiner.*

U.S. Cl. X.R.

328—91, 169